(12) United States Patent
Lim et al.

(10) Patent No.: US 9,846,286 B2
(45) Date of Patent: Dec. 19, 2017

(54) WAVELENGTH DIVISION MULTI-CHANNEL OPTICAL MODULE AND MANUFACTURING METHOD THEREOF

(71) Applicant: ELECTRONICS AND TELECOMMUNICATIONS RESEARCH INSTITUTE, Daejeon (KR)

(72) Inventors: Kwon Seob Lim, Gwangju (KR); Hyoung Jun Park, Gwangju (KR); Hyun Seo Kang, Gwangju (KR); Jai Sang Koh, Gwangju (KR); Keo Sik Kim, Gwangju (KR); Young Sun Kim, Gwangju (KR); Jeong Eun Kim, Gwangju (KR); Ji Hyoung Ryu, Jeonju (KR); Eun Kyoung Jeon, Gwangju (KR); Young Soon Heo, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/952,805

(22) Filed: Nov. 25, 2015

(65) Prior Publication Data
US 2016/0154195 A1    Jun. 2, 2016

(30) Foreign Application Priority Data

Nov. 27, 2014  (KR) .................. 10-2014-0167766
Nov. 25, 2015  (KR) .................. 10-2015-0165354

(51) Int. Cl.
*G02B 6/32*    (2006.01)
*G02B 6/42*    (2006.01)

(52) U.S. Cl.
CPC ............... *G02B 6/425* (2013.01); *G02B 6/32* (2013.01); *G02B 6/4214* (2013.01); *G02B 6/4215* (2013.01); *G02B 6/4244* (2013.01); *G02B 6/428* (2013.01); *G02B 6/4227* (2013.01); *G02B 6/4245* (2013.01); *G02B 6/4251* (2013.01)

(58) Field of Classification Search
CPC ...... G02B 6/4224; G02B 6/32; G02B 6/4214; G02B 6/4215; G02B 6/4244; G02B 6/425; G02B 6/4227; G02B 6/4245; G02B 6/4251; G02B 6/428
USPC .......................................................... 385/33
See application file for complete search history.

(56) References Cited

U.S. PATENT DOCUMENTS

| 7,004,645 | B2 | 2/2006 | Lemoff et al. |
| 7,724,439 | B2* | 5/2010 | Li .................. G02B 3/0056 264/1.7 |
| 8,600,236 | B2 | 12/2013 | Shin et al. |
| 2003/0063844 | A1 | 4/2003 | Caracci et al. |
| 2003/0215240 | A1 | 11/2003 | Grann et al. |

(Continued)

*Primary Examiner* — Jerry Blevins

(57) ABSTRACT

Provided herein is an optical module including: an optical receptacle including a first lens and a second lens; a lens module including a lens unit facing the second lens of the optical receptacle; and an optical element configured to receive a beam emitted from the lens module or form a beam to be emitted to the lens module. A horizontal length and a vertical length of a cross-section of the first lens may differ from each other, and a horizontal length and a vertical length of a cross-section of the second lens may differ from each other.

20 Claims, 16 Drawing Sheets

(56) References Cited

U.S. PATENT DOCUMENTS

| | | | |
|---|---|---|---|
| 2005/0157990 A1* | 7/2005 | Mazotti | G02B 6/4251 |
| | | | 385/94 |
| 2006/0088255 A1 | 4/2006 | Wu et al. | |
| 2007/0236955 A1* | 10/2007 | Fowler | F21V 29/02 |
| | | | 362/554 |
| 2008/0137519 A1 | 6/2008 | Ishigami | |
| 2010/0183266 A1* | 7/2010 | Shimoda | G02B 6/4224 |
| | | | 385/88 |
| 2011/0075887 A1* | 3/2011 | Tanaka | G01M 11/0221 |
| | | | 382/106 |
| 2011/0110666 A1* | 5/2011 | Shin | G02B 6/4215 |
| | | | 398/88 |
| 2012/0045176 A1* | 2/2012 | Hsu | G02B 6/32 |
| | | | 385/74 |
| 2012/0128295 A1 | 5/2012 | Lim et al. | |
| 2013/0129281 A1 | 5/2013 | Son et al. | |
| 2013/0163106 A1* | 6/2013 | Chang | H02N 2/126 |
| | | | 359/824 |
| 2013/0272665 A1 | 10/2013 | Lim et al. | |
| 2015/0145086 A1* | 5/2015 | Rokuhara | H01S 5/005 |
| | | | 257/432 |

* cited by examiner

WAVELENGTH DIVISION MULTI-CHANNEL OPTICAL MODULE AND MANUFACTURING METHOD THEREOF

TECHNICAL FIELD

Various embodiments of the present disclosure relates to a wavelength division multi-channel optical module and a manufacturing method thereof.

BACKGROUND OF THE INVENTION

In an AOC (Active Optical Cable) for an active HDMI (High Definition Multimedia Interface), a DisplayPort, a DVI (Digital Video Interface), etc. which are recently rapidly increasing in demand, there is the need for an optical module of four channels or more which focuses four wavelengths on a single optical fiber to transmit A/V (Audio/Video) data. Most AOC cables on the market have a structure using four or two optical fibers. However, the AOC cables having such a structure are disadvantageous in that installation, maintenance, and repair are difficult. These problems may be exacerbated in long-distance transmission.

DISCLOSURE OF THE INVENTION

Technical Problem

Various embodiments of the present disclosure are directed to a bidirectional optical module which can transmit, receive, or transmit/receive an optical signal of multiple wavelengths using a single optical fiber.

Furthermore, various embodiments of the present disclosure are directed to not only a bidirectional optical module for communication but also a single-optical-fiber integrated wavelength division multiplexing type multi-channel optical module for data transmission.

In addition, various embodiments of the present disclosure are directed to a method of mounting an optical component of the wavelength division multi-channel optical module using a manual surface-mounting method.

Various embodiments of the present disclosure are directed to an optical module in which a plurality of optical elements are arranged in a row so that the optical elements can be easily and precisely mounted and the structure of the optical module can be simplified. Furthermore, an optical element, a lens module, an alignment board, a PCB (Printed Circuit Board), and a package can be manually aligned at one time. To enhance optical coupling efficiency of a plurality of optical elements arranged in a row, a lens-integrated optical receptacle which transforms the shape of light into a horizontal direction (sideways) is actively aligned, whereby the optical coupling efficiency can be maximized. Furthermore, various embodiments of the present disclosure are directed to a wavelength division bidirectional multi-channel optical module which can be adapted to mass production, and a method of manufacturing an optical component or electronic component including the optical module using a manual surface-mounting method.

The technical object of the present disclosure is not limited to the above-mentioned object, and those skilled in this art will be able to easily understand other unmentioned objects from the following description.

Technical Solution

One embodiment of the present disclosure provides an optical module including: an optical receptacle including a first lens and a second lens; a lens module including a lens unit facing the second lens of the optical receptacle; and an optical element configured to receive a beam emitted from the lens module or form a beam to be emitted to the lens module, wherein a horizontal length and a vertical length of a cross-section of the first lens differ from each other, and a horizontal length and a vertical length of a cross-section of the second lens differ from each other.

The optical module may further include an alignment board provided to align the lens module.

The lens module may include a guide column, and the alignment board may include a guide column alignment hole into which the guide column is inserted.

The alignment board may include an alignment mark for mounting of the optical element, and the optical element may be mounted on the alignment mark.

The lens module may include a lens module body in which the lens unit is included. The lens unit may be formed on a surface of the lens module body that faces the second lens. A surface of the lens module body that faces the surface formed with the lens unit may include an inclined reflective surface.

The lens module may include a lower lens unit formed on a lower surface of the lens module body. The optical element may be disposed below the lower lens unit The lens module may include a protrusion provided on the lower surface of the lens module body and configured to maintain a distance between the optical element and the lower lens unit.

The optical module may further include a printed circuit board mounted with the lens module and the alignment board. The printed circuit board may include a filter module alignment hole into which the guide column is inserted.

The optical module may further include a drive integrated circuit disposed on the alignment board.

The optical module may further include a package mounted with the printed circuit board. The package may include a package guide column configured to mount the printed circuit board in the package. The printed circuit board may include a package alignment hole into which the package guide column is inserted.

The lens module may further include a block filter provided in the lens unit.

At least one of the first lens, the second lens, and the lens unit may be a spherical lens or an aspherical lens.

The optical element may be an array-type optical element.

Another embodiment of the present disclosure provides a method of manufacturing an optical module, including: forming an optical receptacle including a first lens formed such that a horizontal length and a vertical length of a cross-section thereof differ from each other, and a second lens formed such that a horizontal length and a vertical length of a cross-section thereof differ from each other; forming a lens module including a lens unit and a guide column; aligning the lens module by inserting the guide column of the lens module into a guide column alignment hole of an alignment board; and aligning the optical receptacle such that the lens unit faces the second lens of the optical receptacle.

The method may further include aligning the lens module and the alignment board on a printed circuit board by inserting the guide column into a filter module alignment hole of the printed circuit board.

The aligning of the lens module may include mounting an optical element on an alignment mark of the alignment board.

The method may further include aligning the printed circuit board in a package by inserting a package guide column of the package into a package alignment hole of the printed circuit board.

The aligning of the optical receptacle may include sealing the optical receptacle with the package.

The forming of the optical receptacle may include forming the optical receptacle using a plastic injection molding method.

The forming of the lens module may include forming the lens module using a plastic injection molding method.

At least one of the first lens, the second lens, and the lens unit may be formed in a spherical or aspherical shape.

Effects of the Invention

Various embodiments of the present disclosure can provide a bidirectional optical module which can transmit, receive, or transmit/receive an optical signal of multiple wavelengths using a single optical fiber.

Furthermore, various embodiments of the present disclosure can provide not only a bidirectional optical module for communication but also a single-optical-fiber integrated wavelength division multiplexing type multi-channel optical module for data transmission.

In addition, various embodiments of the present disclosure can provide a method of mounting an optical component of the wavelength division multi-channel optical module using a manual surface-mounting method.

Moreover, various embodiments of the present disclosure can provide an optical module in which a plurality of optical elements are arranged in a row so that the optical elements can be easily and precisely mounted and the structure of the optical module can be simplified. Furthermore, an optical element, a lens module, an alignment board, a PCB (Printed Circuit Board), and a package can be manually aligned at one time. To enhance optical coupling efficiency of a plurality of optical elements arranged in a row, a lens-integrated optical receptacle which transforms the shape of light into a horizontal direction (sideways) is actively aligned, whereby the optical coupling efficiency can be maximized. Furthermore, various embodiments of the present disclosure can provide a wavelength division bidirectional multi-channel optical module which can be adapted to mass production, and a method of manufacturing an optical component or electronic component including the optical module using a manual surface-mounting method.

A wavelength division multi-channel optical module according to an embodiment of the present disclosure can solve difficulties of an optical alignment process and difficulties in precisely mounting optical components such as an optical fiber, a plurality of lenses, and an optical element, which are significant problems in manufacturing the conventional multi-channel optical module. In addition, the present disclosure has high price competitiveness. The optical components can be mounted using a manual surface-mounting technique so that the present disclosure can be easily adapted to mass production. The optical coupling efficiency can be maximized using a receptacle active-alignment technique which is well known in the conventional technique.

Furthermore, a circular beam can be transformed in a horizontally rectangular beam using an optical receptacle including an elliptical (semilunar) lens, or a rectangular beam can be divided and transformed into circular beams again using a vertically elongated elliptical lens, so that it is possible to arrange optical elements in a row. This makes it possible to manufacture a wavelength division multi-channel optical module that can facilitate channel expansion and mounting of an optical element.

In addition, because an alignment mark is formed on an alignment board, the optical element can be precisely mounted. Since the alignment board has an alignment through hole, it can be precisely aligned with a filter module.

Furthermore, the lens module has a protruding guide column so that the PCB and the package can be aligned at one time. The lens module has a protrusion so that the distance between it and the optical element can be maintained constant. Therefore, precise manual surface-mounting of the lens module becomes possible.

Furthermore, as optical modules according to an embodiment of the present disclosure may be horizontally arranged in a row, an array optical element can be easily used. Thereby, light loss which may be caused on a central portion of a light source in the case of a two-dimensional structure can be minimized. In addition, reduction in size is possible.

The effects of the present disclosure are not limited to the above-mentioned effects, and those skilled in this art will be able to easily understand other unmentioned effects from the following description.

DETAILED DESCRIPTION OF THE INVENTION

Figure 1:
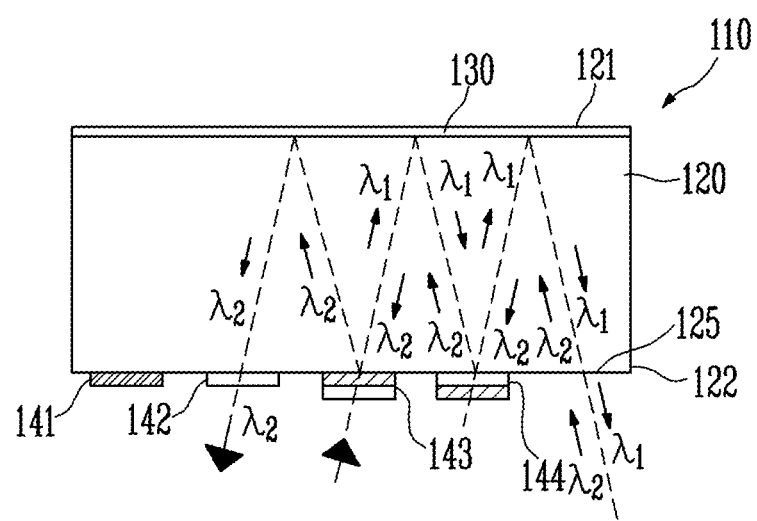
FIG. 1 is a view showing an example of a conventional multi-channel optical module.

Hereinafter, an exemplary embodiment of the present disclosure will be described in detail with reference to the attached drawings.

Detailed description of functions and structures well known to those skilled in the art will be omitted to avoid obscuring the subject matter of the present disclosure. This aims to omit unnecessary description so as to make the subject matter of the present disclosure clear.

It will be understood that when an element is referred to as being "coupled" or "connected" to another embodiment, it can be directly coupled or connected to the other element or intervening elements may be present therebetween so that the elements may be electrically coupled to each other. In the specification, when it is said that a specific element is "included", it may mean that elements other than the specific element are not excluded and that additional elements may be included in the embodiments of the present disclosure or the scope of the technical spirit of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Furthermore, components shown in the embodiments of the present disclosure are independently shown so as to represent different characteristic functions. Thus, it does not mean that each component forms a constituent unit of separate hardware or one software. In other words, each component is merely individually illustrated for convenience of explanation. At least two of components may be combined to form one component, or one component may be divided into a plurality of components to perform their functions. Such embodiments where components are combined or one component is divided also fall within the bounds of the present disclosure if not departing from the essence of the present disclosure.

Furthermore, some elements are not essential elements for the present disclosure, but may be optional elements for improving only performance. The present disclosure may be implemented using only essential elements for implementing the essence of the present disclosure other than elements used to improve only performance, and a structure including only essential elements other than optional elements used to improve only performance is included in the scope of the present disclosure.

If in the specification, detailed descriptions of well-known functions or configurations would unnecessarily obfuscate the gist of the present disclosure, the detailed descriptions will be omitted. Hereinafter, an exemplary embodiment of the present disclosure will be described in detail with reference to the attached drawings. The terms and words used for elements in the description of the present disclosure are determined based on the functions of the elements in the present disclosure. The terms and words may be changed depending on the intention or custom of users or operators, so that they must be defined based on the whole content of the present specification.

Figure 2:
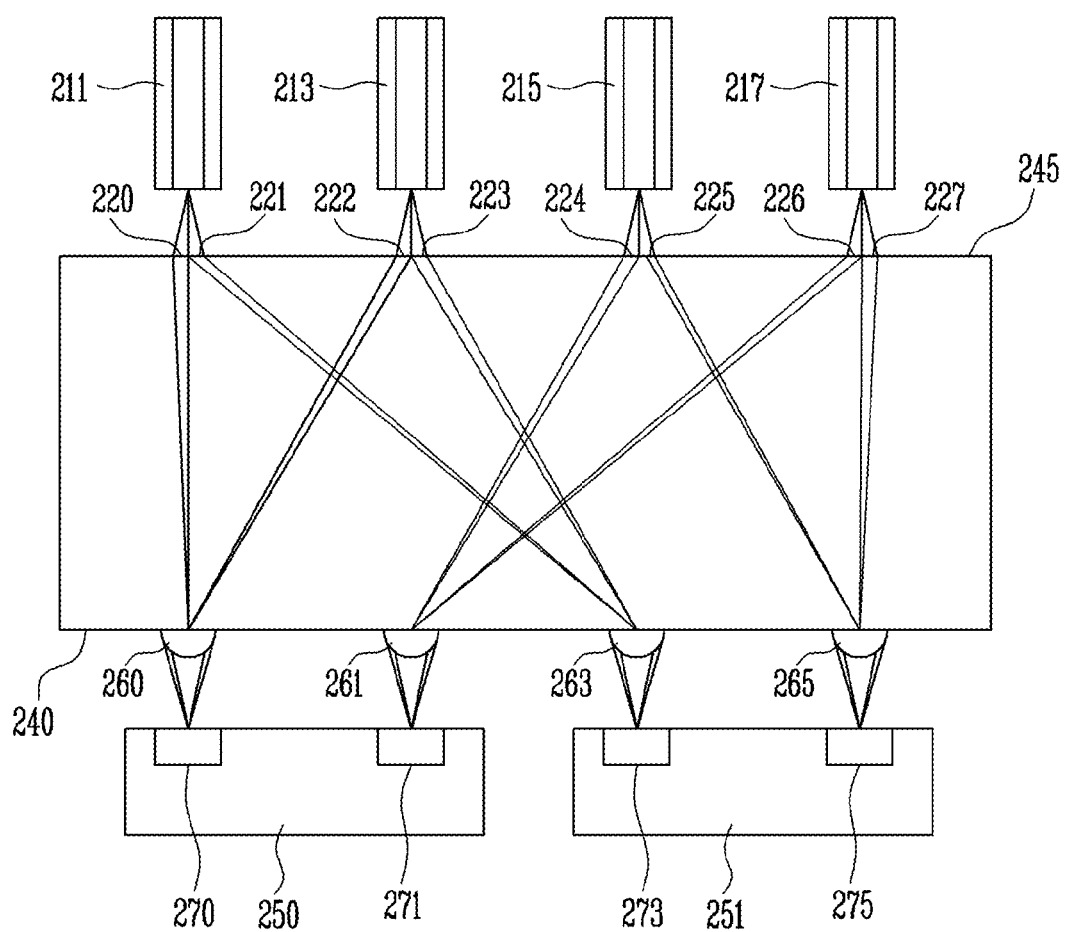
FIG. 2 is a view showing another example of a conventional multi-channel optical module.

FIG. 1 is a view illustrating an example of a conventional multi-channel optical module. FIG. 2 is a view illustrating another example of a conventional multi-channel optical module.

Referring to FIG. 1, a multi-channel optical module 110 which can focus a plurality of wavelengths on one optical fiber 160 is generally configured to use coarse wavelength division multiplexing (CWDM) filters 141, 142, 143, and 144 and reflect lights $\lambda 1$ and $\lambda 2$ in a zigzag form for optical coupling.

For this, the optical module 110 may include a lens unit 120. A mirror 130 may be disposed on a surface 121 of the lens unit 120. Filters 141, 142, 143, and 144 may be disposed on another surface 122 of the lens unit 120 that faces the surface 121. A region through which allows light to pass may be formed in an end of the surface on which the filters 141, 142, 143, and 144 are disposed. The optical fiber 160 may receive a first light $\lambda 1$ and transmit a second light $\lambda 2$. Only the second filter 142 may allow the second light $\lambda 2$ to pass therethrough. Only the third filter 143 may allow the first light $\lambda 1$ to pass therethrough. In this case, the first light $\lambda 1$ is input through the third filter 143 and reflected by the mirror 130. The reflected light may be inputted to the fourth filter 144. However, because the fourth filter 144 is a filter which does not allow the first light $\lambda 1$ to pass therethrough, the first light $\lambda 1$ may be reflected and be incident on the mirror 130. Thereafter, the first light $\lambda 1$ may be reflected again by the mirror 130 and then inputted to the optical fiber 160. The second light $\lambda 2$ is outputted from the optical fiber 160 and is inputted to the lens unit 120. The second light $\lambda 2$ is reflected on the mirror 130 and is inputted to the fourth filter 144. However, because the fourth filter 144 does not allow the second light $\lambda 2$ to pass therethrough, the second light $\lambda 2$ is reflected and is incident on the mirror 130. Thereafter, the second light $\lambda 2$ may be reflected again by the mirror 130 and then inputted to the third filter 143. The second light $\lambda 2$ is reflected by the third filter 143 and reflected again by the mirror 130 before being inputted to the second filter 142. Because the second filter 142 is a filter which allows the second light $\lambda 2$ to pass therethrough, the second light $\lambda 2$ is output through the second filter 142.

Referring to FIG. 2, in the case of a multi-channel optical module which can focus a plurality of wavelengths on each of optical fibers 211, 213, 215, and 217, lenses 260, 261, 263, 265, 220, 221, 222, 223, 224, 225, 226, and 227 which are two-dimensionally arranged may be used.

Light outputted from each of light sources 270, 271, 273, and 275 included in light source units 250 and 251 may be divided into two lights 230, 231, 232, 233, 234, 235, 236, 237 according to a wavelength while passing through a corresponding first lens 260, 261, 263, 265 formed on a first surface 240 of a lens unit. The divided lights 230, 231, 232, 233, 234, 235, 236, and 237 pass through second lens 220, 221, 222, 223, 224, 225, 226, and 227 formed on a second surface 245 of the lens unit so that two lights can be focused into one light. Each of the focused lights may be inputted to the corresponding optical fiber 211, 213, 215, 217.

For example, a first light outputted from the first light source 270 may be divided into a first-1 light 230 and a first-2 light 232 according to a wavelength while passing through the first lens 260. A third light outputted from the third light source 273 may be divided into a third-1 light 231 and a third-2 light 233 according to a wavelength while passing through the third lens 263. The first-1 light 230 and the third-1 light 231 may be focused while passing through the second-1 lens 220 and the second-2 lens 221, and then inputted to the first optical fiber 211.

However, the conventional multi-channel optical module is problematic in that because there is a large difference in optical path according to each wavelength, a typical focusing lens cannot be used, and it is very difficult to align lights. Furthermore, in the case where lights divided by several lenses that are two-dimensionally arranged are focused by the corresponding lenses, when the multiple individual light sources are two-dimensionally mounted, the shapes and dimensions of light sources after a dicing operation for an individual chip may be different from each other. This makes precise mounting difficult, whereby optical alignment efficiency may be reduced, and a failure rate may be increased. Furthermore, as an optical element, two lens, and an optical fiber must be aligned with each other, time and cost required for the alignment operation are increased.

Furthermore, as shown in FIG. 2, in the case where the two-dimensionally arranged lenses are used, light emitted from a central portion of a light source on which the intensity of light is largest cannot be used. That is, because light is divided into two portions while passing through the first lens, light emitted from the central portion of the light source on which the intensity of light is largest cannot be used. Therefore, there are problems in that optical loss is increased, and manufacture of only an optical transmitting module is allowed.

To overcome the above-mentioned problems, various embodiments of the present disclosure provide a single optical fiber focusing wavelength division multiplexing multi-channel optical module which can transmit or receive or transmit/receive an optical signal of multiple wavelengths using a single optical fiber and can be used not only as a bidirectional optical module but also for data transmission; and a method of mounting an optical component using a manual surface mounting method.

For this, a single optical fiber focusing multi-channel optical module according to an embodiment of the present disclosure may be configured such that optical element mounting can be embodied by arranging a plurality of optical elements in a row; it is possible to manually align a lens module, an alignment board, a printed circuit board (PCB), and a package; and a lens integrated optical receptacle for changing the shape of light in a horizontal direction (sideways) to enhance optical coupling efficiency can be actively aligned.

Figure 3:
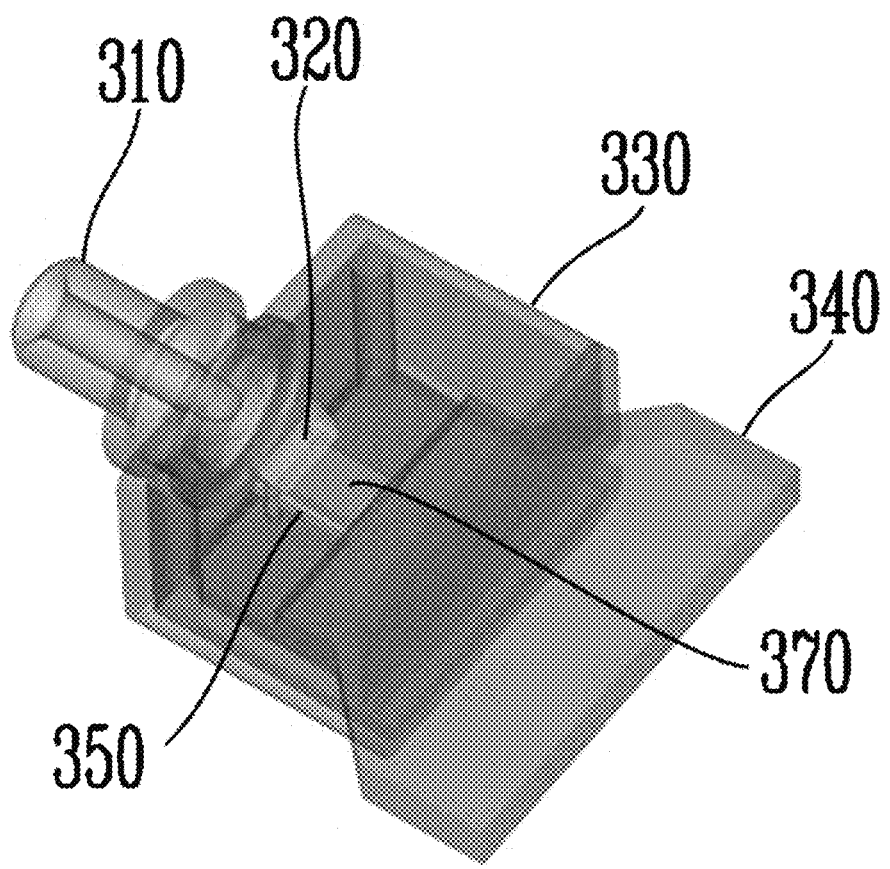
FIG. 3 is a view illustrating an example of a wavelength division multiplexing multi-channel optical module according to an embodiment of the present disclosure.

FIG. 3 is a view illustrating an example of a wavelength division multiplexing multi-channel optical module according to an embodiment of the present disclosure.

Referring to FIG. 3, the wavelength division multiplexing multi-channel optical module according to the present embodiment may include an optical receptacle 310, a lens array module 320, a package 330, a PCB 340, an alignment board 350, and a drive IC (integrated circuit) unit 370. Although not shown in FIG. 3, an optical element 360 may be provided between the lens module 320 and the alignment board 350. For the sake of explanation, the term "wavelength division multiplexing multi-channel optical module" may be used interchangeably with the term "optical module", "multi-channel optical module", or "single optical fiber focusing multi-channel optical module", etc. The term "lens module 320" may be used interchangeably with the term referring to a module such as a lens array module, which includes a lens. Furthermore, the term "light" may be used interchangeably with the term "beam".

The optical receptacle 310 may include a lens which expands a beam emitted from an optical fiber and collimates it. Furthermore, the optical receptacle 310 may transform a rectangular beam, received from the lens module 320, into a circular beam through the lens and input it to the optical fiber. Detailed configuration of the optical receptacle 310 will be described later herein.

The lens module 320 may focus collimated beams on one or more light receiving elements 360. The lens module 320 may include a guide column which protrudes for manual optical alignment with the light receiving element, and a protrusion which maintains the distance between the light element 360 and the lens. Detailed configuration of the lens module 320 will be described later herein.

The alignment board 350 may include a guide column alignment hole into which the guide column of the lens module 320 is inserted. An alignment mark for mounting the optical element 360 may be formed on an upper surface of the alignment board 350. Detailed configuration of the alignment board 350 will be described later herein.

The PCB 340 may include a filter module alignment hole into which the guide column of the lens module 320 is inserted, and a package alignment hole for alignment with the package 330. Detailed configuration of the PCB 340 will be described later herein.

The package 330 may include therein a package guide column for alignment with the PCB 340. Detailed configuration of the package 330 will be described later herein.

The drive IC unit 370 may be mounted on the upper surface of the alignment board 350 and control the operation of the optical module. The drive IC unit 370 may also conduct a signal amplification function. Thus, the drive IC unit 370 may be called an amplification IC unit. The drive IC unit may function as a control unit which controls the overall operation of the optical module.

The optical receptacle 310 functions to focus collimated beams, received from the lens module 320, on a single optical fiber at the same time, thus making it possible to manufacture a wavelength division multi-channel bidirectional optical module.

Figure 4A:
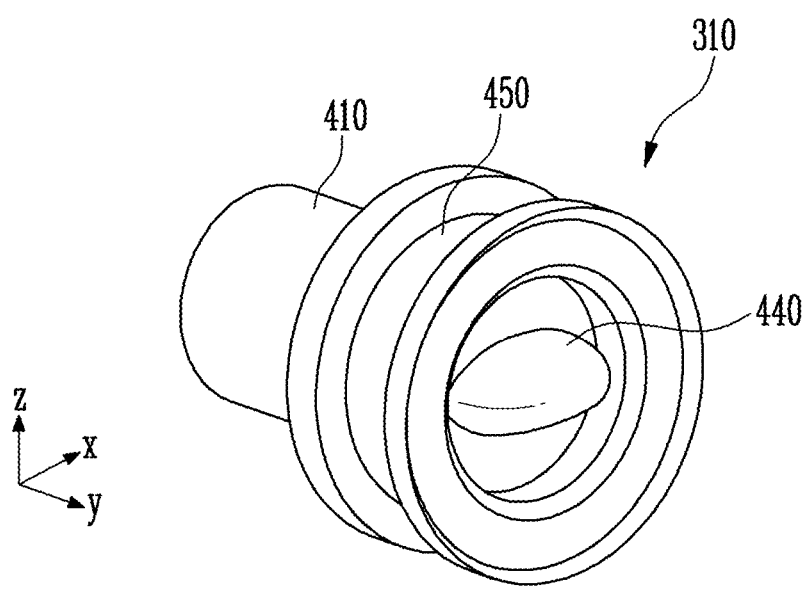
FIG. 4a is a perspective view illustrating an example of an optical receptacle of an optical module according to the embodiment of the present disclosure.
Figure 4B:
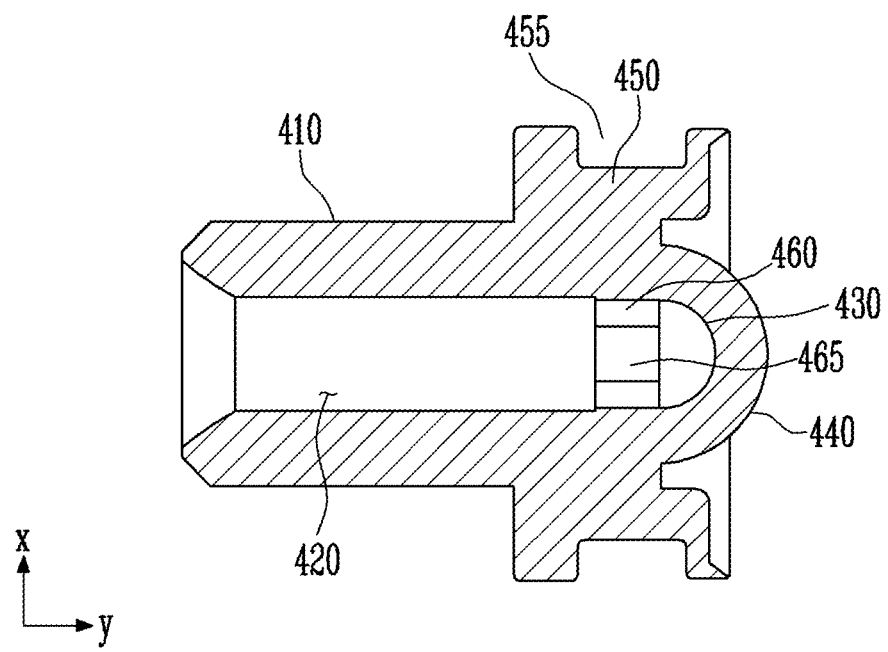
FIG. 4b is a sectional view taken along the x-y direction, showing the optical receptacle of the optical module according to the embodiment of the present disclosure.
Figure 4C:
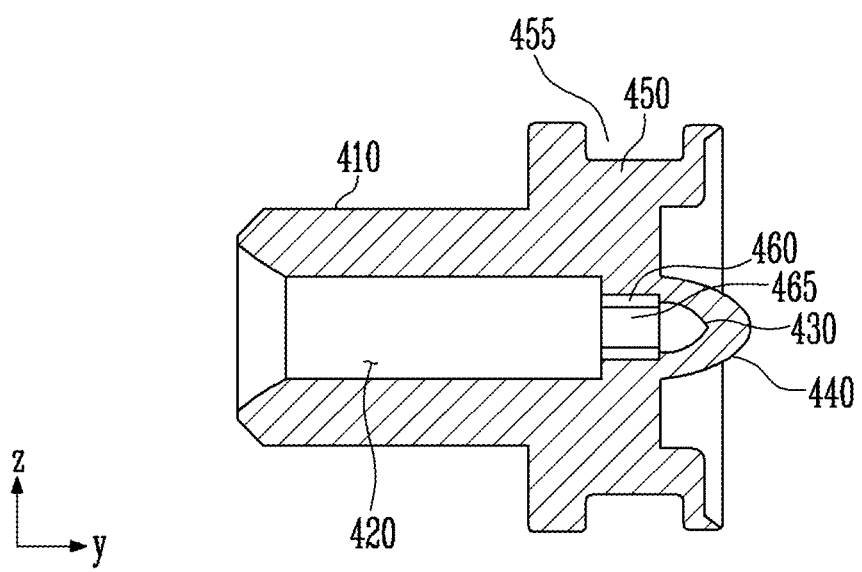
FIG. 4c is a sectional view taken along the y-z direction, showing the optical receptacle of the optical module according to the embodiment of the present disclosure.

FIG. 4a is a perspective view illustrating an example of the optical receptacle of the optical module according to the embodiment of the present disclosure. FIG. 4b is a sectional view taken along the x-y direction, showing the optical receptacle of the optical module according to the embodiment of the present disclosure. FIG. 4c is a sectional view taken along the y-z direction, showing the optical receptacle of the optical module according to the embodiment of the present disclosure.

Referring to FIGS. 4a to 4c, the optical receptacle 310 of the optical module according to the embodiment of the present disclosure may include a tubular body 410. In some embodiments, a flange 450 may be provided on one end of the body 410. The flange 450 may be formed to facilitate the coupling of the optical receptacle 310 to the package 330. An annular recess 455 may be formed in an outer surface of the flange 450.

An optical fiber insert hole 420 for insertion of an optical fiber is formed in the body 410 in a longitudinal direction (y-axis direction) of the body 410. A first lens 430 may be disposed in a longitudinal end of the optical fiber insert hole 420. In some embodiments, a first lens insert hole for insertion of the first lens 430 may be formed in the body 410 at a position corresponding to the longitudinal end of the optical insert hole 420. The first lens 430 may be a lens which is convex in a direction opposite to the optical insert hole 420.

The first lens 430 may have an elliptical cross-section. In other words, the cross-section of the first lens 430 may be curved and, in detail, have an elliptical shape in which a horizontal (x-axial) length and a vertical (z-axial) length thereof differ from each other.

In some embodiments, an optical fiber stopper 460 for limiting the position of the optical fiber may be provided between the first lens 430 and the optical insert hole 420. The optical fiber stopper 460 functions to limit the position to which the optical fiber is longitudinally inserted into the optical fiber insert hole 420. The optical fiber can be inserted to a depth corresponding to the optical fiber stopper 460. In some embodiments, the optical fiber stopper 460 may have an elliptical cross-section. In other words, the cross-section of the optical fiber stopper 460 may be curved and, in detail, have an elliptical shape in which a horizontal (x-axial) length and a vertical (z-axial) length thereof differ from each other. In some embodiments, a protrusion 465 may be further provided on an outer surface of the optical fiber stopper 460 so that a beam can be inputted to the optical fiber. The protrusion 465 functions to accurately set the position of the optical fiber. A vertical (z-axial) length of the protrusion 465 may be the same as a vertical (z-axial) length of the first lens 430, and the cross-section of the protrusion 465 may be circular.

A second lens 440 may be formed on an outer surface of a longitudinal (y-axial) end of the body 410. The second lens 440 may be formed on a surface of the body 410 that is opposite to the end thereof in which the optical fiber insert hole 420 is formed. The second lens 440 may protrude to be convex outward in the longitudinal direction of the body 410. The second lens 440 may have an elliptical cross-section. In other words, the cross-section of the second lens 440 may be curved and, in detail, have an elliptical shape in which a horizontal (x-axial) length and a vertical (z-axial) length thereof differ from each other. Furthermore, the cross-sectional area of the second lens 440 is greater than that of the first lens 410. For example, the horizontal (x-axial) length of the second lens 440 may be greater than the horizontal (x-axial) length of the first lens 430. The vertical (z-axial) length of the second lens 440 may be greater than the vertical (z-axial) length of the first lens 430.

In brief, the optical fiber insert hole 420 is formed in the body 410 in the longitudinal direction of the body 410. The first lens 430 is disposed in the end of the optical fiber insert hole 420. The second lens 440 may be formed on the outer surface of the body 410 at position corresponding to the end of the optical fiber insert hole 420. A hollow space may be formed between the first lens 430 and the second lens 440. Thereby, a beam that is incident on the first lens 430 may be refracted before being incident on the second lens 440, and a beam that is incident on the second lens 440 may be refracted before being incident on the first lens 430.

In some embodiments, the optical receptacle 310 may be formed by plastic injection molding. In this case, the first lens 430 and the second lens 440 may be integrally formed with the body 410. Furthermore, in the case where the injection molding method is used, the first lens 430 and/or the second lens 440 of the optical receptacle 310 may be formed in either a spherical shape or an aspherical shape so that the optical coupling efficiency can be enhanced.

Because the first lens 430 and the second lens 440 have elliptical cross-sections, the first lens 430 and the second lens 440 may transform a circular beam, emitted from the optical fiber, into a rectangular beam. On the contrary, the first lens 430 and the second lens 440 may transform a rectangular beam, received from the lens module 420, into a circular beam and focus it on the optical fiber.

Figure 5A:
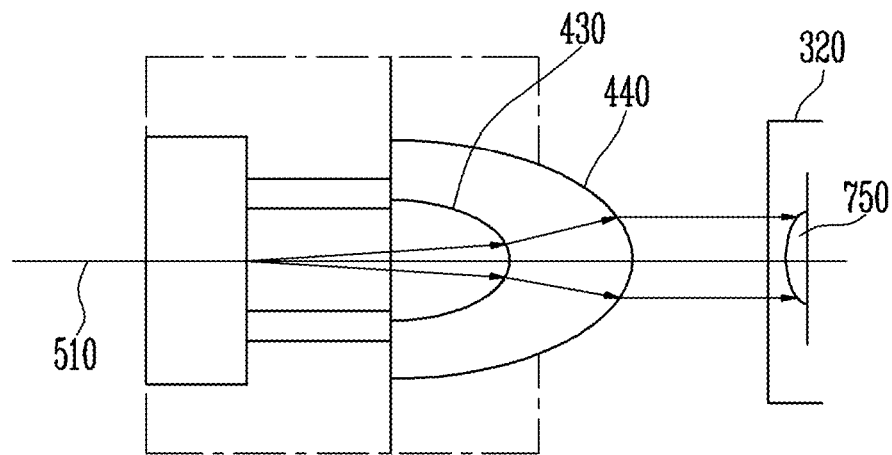
FIG. 5a is a sectional view taken along the y-z direction, showing the optical receptacle to illustrate an example in which a circular beam emitted from an optical fiber of the optical module according to the embodiment of the present disclosure is transformed into a rectangular beam.
Figure 5B:
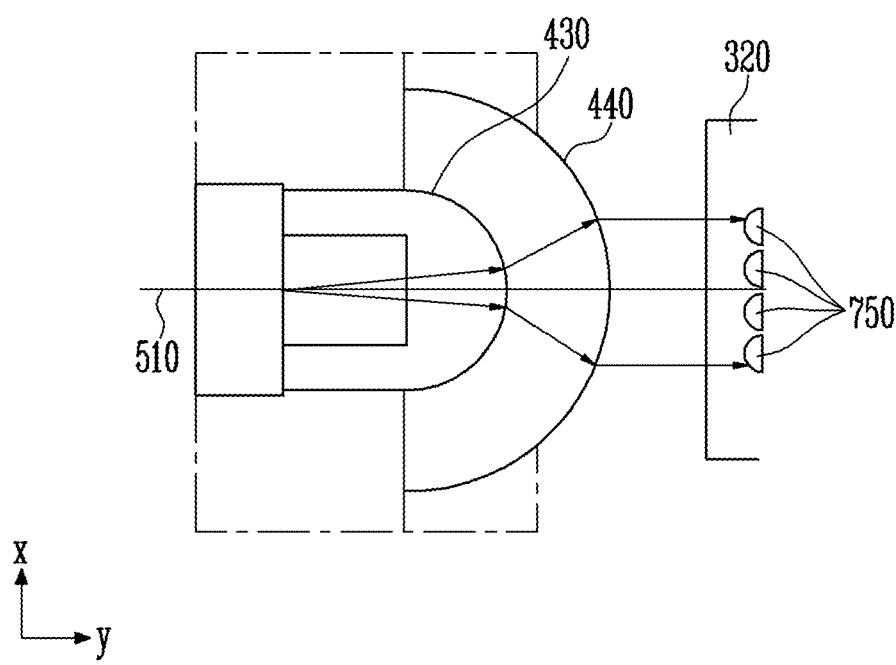
FIG. 5b is a sectional view taken along the y-z direction, showing the optical receptacle to illustrate an example in which a circular beam emitted from the optical fiber of the optical module according to the embodiment of the present disclosure is transformed into a rectangular beam.

FIG. 5a is a sectional view taken along the y-z direction, showing the optical receptacle to illustrate an example in which a circular beam emitted from the optical fiber of the optical module according to the embodiment of the present disclosure is transformed into a rectangular beam. FIG. 5b is a sectional view taken along the y-z direction, showing the optical receptacle to illustrate an example in which a circular beam emitted from the optical fiber of the optical module according to the embodiment of the present disclosure is transformed into a rectangular beam.

Referring to FIGS. 5a and 5b, a circular beam 510 emitted from the optical fiber (not shown) may be incident on the elliptical lens, that is, the first lens 430, in which the horizontal (x-axial) length and the vertical (z-axial) length thereof differ from each other. A beam refracted by the first lens 430 may be incident on the second lens 440 in which the horizontal (x-axial) length and the vertical (z-axial) length thereof differ from each other, and then be incident on the lens module 320. The circular beam 510 emitted from the optical fiber may be transformed into a collimated rectangular beam while passing through the first lens 430 and the second lens 440.

For example, as shown in FIG. 5a, the vertical (z-axial) length of the cross-section of each of the first and second lenses 430 and 440 is shorter than the horizontal (x-axial) length thereof. Hence, it can be understood that, in a sectional view of the optical receptacle taken along the y-z direction, the degree to which the circular beam 510 emitted from the optical fiber is refracted is relatively small.

On the other hand, as shown in FIG. 5b, the horizontal (x-axial) length of the cross-section of each of the first and second lenses 430 and 440 is longer than the vertical (z-axial) length thereof. Hence, it can be understood that, in a sectional view of the optical receptacle taken along the x-y direction, the degree to which the circular beam 510 emitted from the optical fiber is refracted is relatively large.

Therefore, the circular beam 510 that has passed through the first and second lenses 430 and 440 is transformed into a rectangular shape before being inputted to the lens unit 750 of the lens module 320. The lens unit 750 of the lens module 320 may include a plurality of lenses. The lenses may be arranged in the horizontal (x-axial) direction. The rectangular beam that is emitted from the optical receptacle 310 and is elongated in the horizontal (x-axial) direction may be inputted to the lenses of the lens module 320 that are arranged in the horizontal direction.

In FIGS. 5*a* and 5*b*, the case is illustrate in which the circular beam 510 emitted from the optical fiber is transformed into a rectangular beam while passing through the first and second lenses 430 and 440 of the optical receptacle 310 and then is inputted to the lens module 320. However, although not shown, the process in which a rectangular beam inputted from the lens module 320 to the second lens 440 of the optical receptacle 310 is transformed into a circular beam while passing through the first lens 430 and then is inputted to the optical fiber may be conducted in the same manner. In other words, a rectangular beam may be transformed into a circular beam while passing through the second lens 440 and the first lens 430 in each of which the horizontal (x-axial) length and the vertical (z-axial) length of the optical receptacle 310 differ from each other.

Figure 6A:
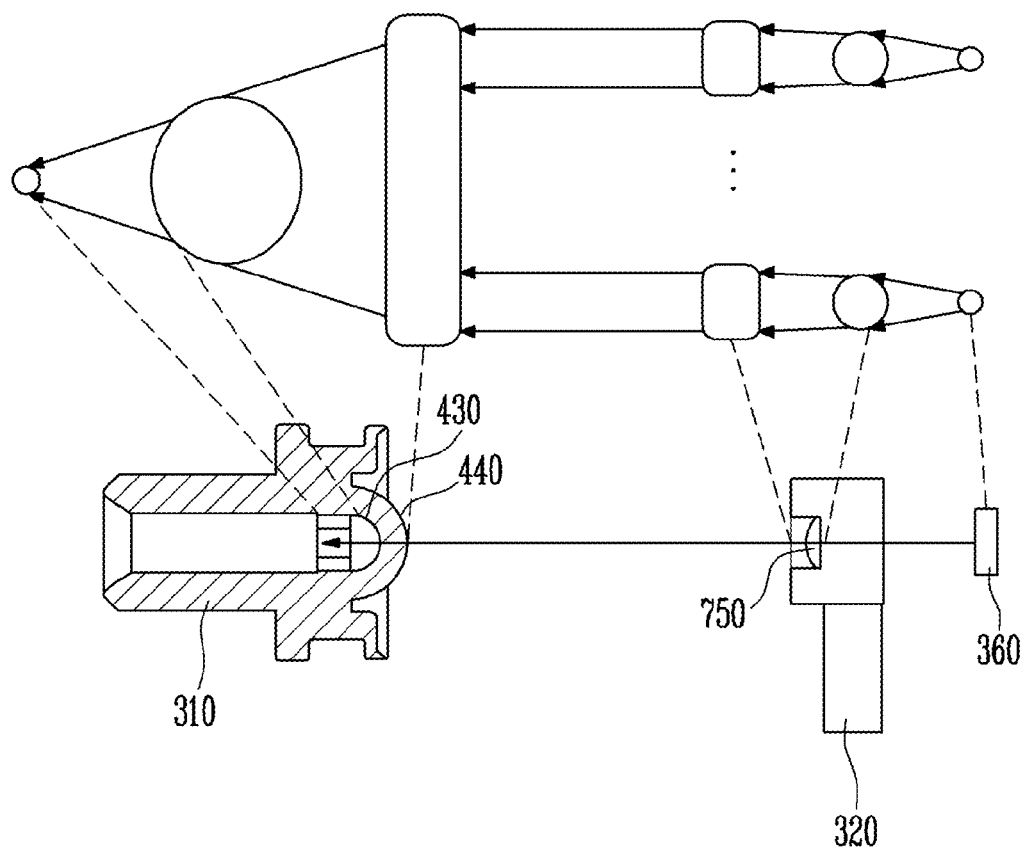
FIG. 6a is a view showing an example of the shape of a beam in the optical receptacle and a lens module when the optical module according to the embodiment of the present disclosure is an optical transmitter.
Figure 6B:
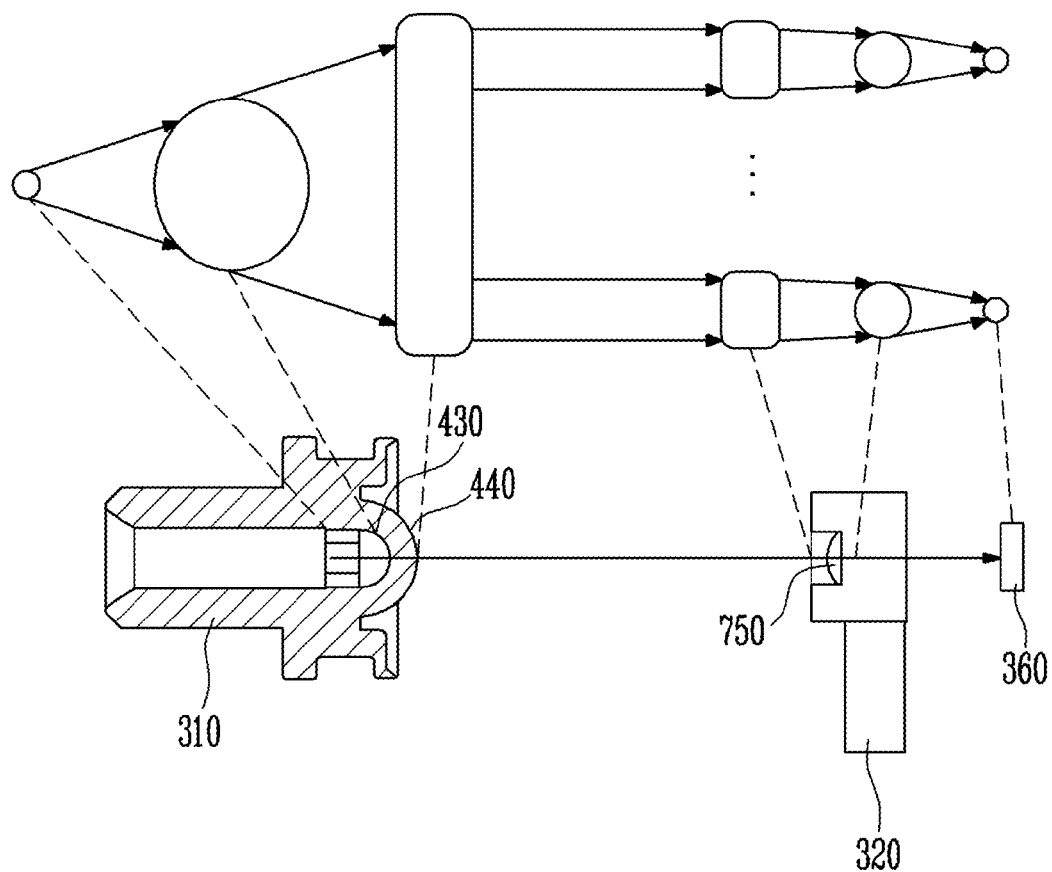
FIG. 6b is a view showing an example of the shape of a beam in the optical receptacle and the lens module in a light emitting mode when the optical module according to the embodiment of the present disclosure is an optical receiver.

FIG. 6*a* is a view showing an example of the shape of a beam in the optical receptacle and the lens module when the optical module according to the embodiment of the present disclosure is an optical transmitter. FIG. 6*b* is a view showing an example of the shape of a beam in the optical receptacle and the lens module in a light emitting mode when the optical module according to the embodiment of the present disclosure is an optical receiver.

Referring to FIG. 6*a*, a circular beam may be formed from the optical element 360. In this case, the optical element 360 may be a light emitting element. The circular beam emitted from the optical element 360 may be diverse and be expanded in size before being inputted to the lens unit 750 of the lens module 320.

As shown in FIG. 5*b*, a plurality of lenses arranged in the horizontal direction may be included in the lens unit 750 of the lens module 320. In this case, when a circular beam emitted from the optical element 360 is inputted to the lenses of the lens unit 750, each lens may form a colligated beam which is elongated in the vertical direction and output it. Here, each lens is configured such that of the beam emitted from the optical element 360, only a beam of a preset wavelength is allowed to pass therethrough.

A plurality of vertically-elongated collimated beams outputted from the respective lenses of the lens unit 750 may be incident on the second lens 440 of the optical receptacle 310 in a form of a single rectangular beam. Although the case is illustrated in the drawing in which the collimated beams emitted from the lens unit 750 are combined with each other to form a single rectangular beam, the present disclosure is not limited to this. In other words, collimated beams emitted from the lenses of the lens unit 750 may be combined with each other as shown in the drawing or, alternatively, be output in a form in which they are separated from each other without being combined.

The beam inputted to the second lens 440 may pass through the second lens 440 and the first lens 430 and be output in a form of a slightly horizontally-elongated elliptical beam. The output elongated elliptical shape may be focused on the optical fiber.

On the contrary to the case of FIG. 6*a*, as shown in FIG. 6*b*, in the optical module according to the embodiment of the present disclosure, a circular beam may be emitted from the optical fiber. The circular beam may be diverged and be expanded in size before being inputted to first lens 430 of the optical receptacle 310. The beam inputted to the first lens 430 may pass through the first lens 430 and the second lens 440 and be output in a form of a single horizontally-elongated elliptical beam. Although in the drawing the beam outputted from the optical receptacle 310 is illustrated as having a single rectangular shape, the present disclosure is not limited to this. That is, the beam may be outputted from the optical receptacle 310 in a form in which the beam is divided into a plurality of separate rectangular beams according to a wavelength.

The rectangular beam outputted from the optical receptacle 310 may be inputted to the lens unit 750 of the lens module 320. The rectangular beam may be transformed into a circular beam via the vertically elongated elliptical lens while passing through the lens unit 750, and then be focused on the optical element 360. In this case, the optical element 360 may be a light receiving element.

Figure 7A:
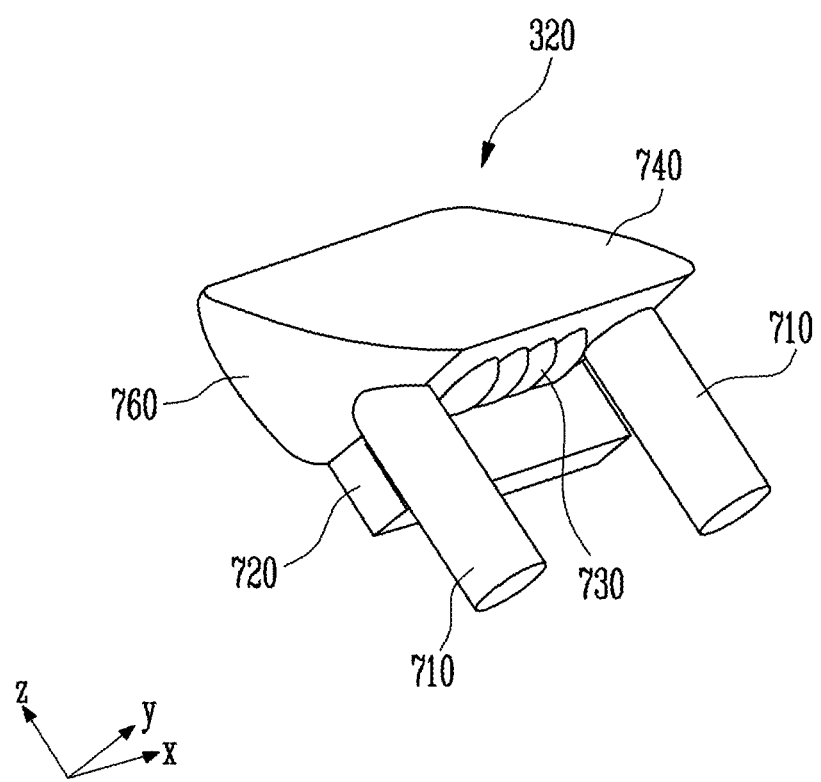
FIG. 7a is a view illustrating an example of a lens module according to an embodiment of the present disclosure.
Figure 7B:
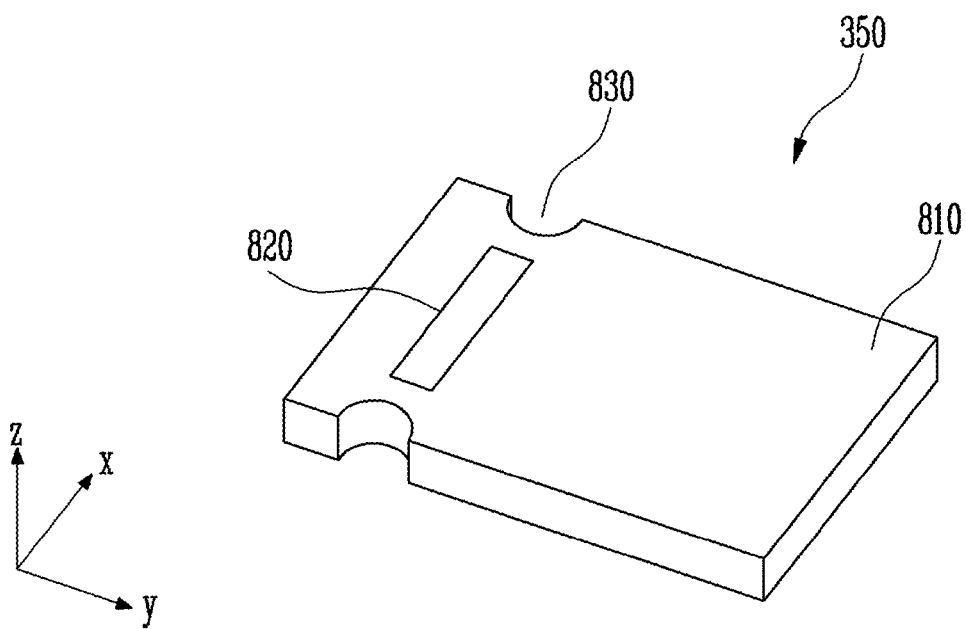
FIG. 7b is a view illustrating an example of an alignment board according to an embodiment of the present disclosure.
Figure 7C:
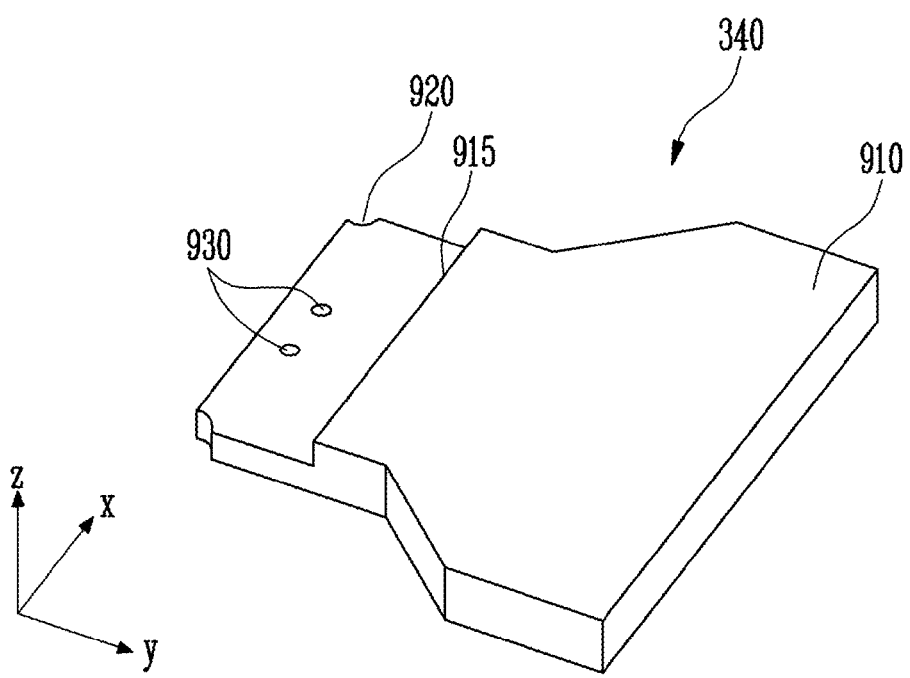
FIG. 7c is a view illustrating an example of a PCB according to an embodiment of the present disclosure.
Figure 8:
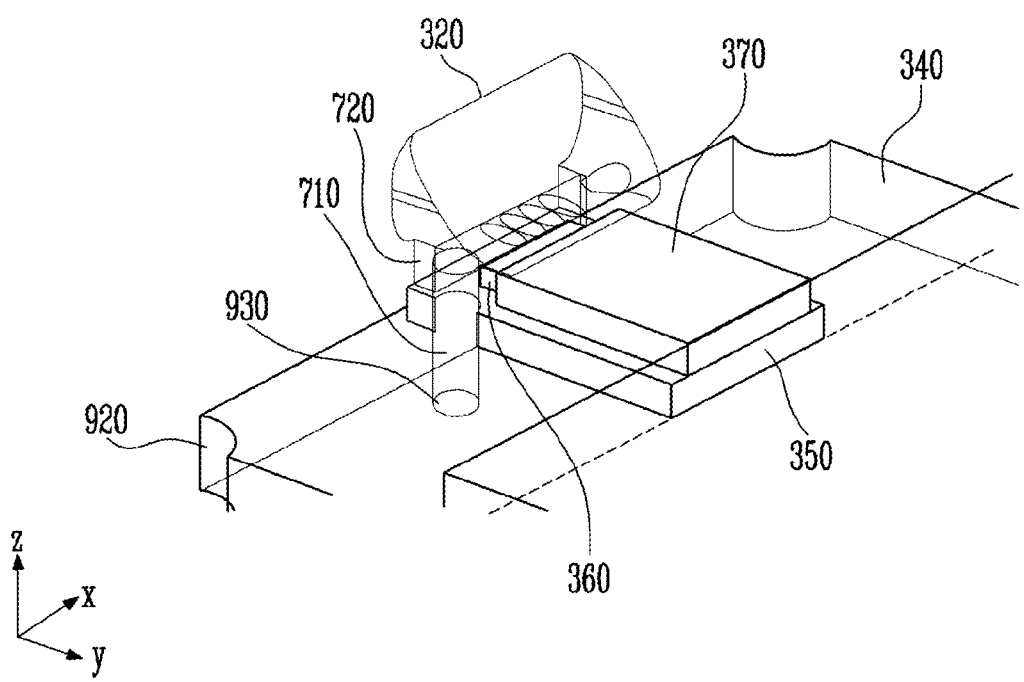
FIG. 8 is a view illustrating an example of the coupling relationship among the lens module, the alignment board, and the PCB according to an embodiment of the present disclosure.

FIG. 7*a* is a view illustrating an example of the lens module according to an embodiment of the present disclosure. FIG. 7*b* is a view illustrating an example of the alignment board according to an embodiment of the present disclosure. FIG. 7*c* is a view illustrating an example of the PCB according to an embodiment of the present disclosure. FIG. 8 is a view illustrating an example of the coupling relationship among the lens module, the alignment board, and the PCB according to an embodiment of the present disclosure.

Depending on the configuration of the optical element 360, the optical module according to an embodiment of the present disclosure may be manufactured into an optical transmitting module, an optical receiving module, or an optical transmitting/receiving module. For example, as shown in FIG. 6*a*, when the optical element 360 is used as a light emitting element, the optical module may be manufactured into an optical transmitting module. As shown in FIG. 6*b*, when the optical element 360 is used as a light receiving element, the optical module may be manufactured into an optical receiving module. Although not shown, when the optical receiving element 360 is used as a light transmitting/receiving element, the optical module may be manufactured into an optical transmitting/receiving module.

Referring to FIG. 7*a*, the lens module 320 according to an embodiment of the present disclosure may include a lens module body 760, a guide column 710, a protrusion 720, etc. The lens module body 760 may include a lens unit 750 and a lower lens unit 730. The lower lens unit 730 may one or more lenses.

The guide column 710 is used for alignment of the lens module 320 with the alignment board. The guide column 710 may protrude downward from the lens module body 760. The guide column 710 may fix the position of the lens module 320 on the alignment board 350 and thus align the horizontal axis and vertical axis (x-axis and y-axis) of the lens module 320. Although the guide column 710 is illustrated as comprising two guide columns 710 in the drawing, the present disclosure is not limited to this. For instance, one or three or more guide columns may be provided.

The protrusion 720 functions to maintain the distance between the optical element 360 and the lenses included in the lower lens unit 730. The protrusion 720 may be formed to protrude downward from the lens module body 760. That is, the protrusion 720 may fix the height of the lens module 320 and thus align the height axis (z-axis) of the lens module 320. Although the case is illustrated in the drawing in which one protrusion 720 is provided, the present disclosure is not limited to this. For example, two or more guide columns may be formed.

The lower lens unit 730 may include a plurality of lenses. The plurality of lenses may receive a beam emitted from the optical element 360 that is disposed below the lower lens unit 730.

A surface of the lens module body 760 that faces the lens unit 750 may include an inclined reflective surface 740. The reason for this is for performing an operation in which when the optical module includes a surface emitting optical element 360, light that is incident on the lower lens unit 730 of the lens module 320 is reflected by the inclined reflective surface 740 and transmitted to the lens unit 750 disposed on the surface facing the reflective surface 740, or for performing the reverse operation. In some embodiments, the reflective surface 740 may be inclined at 45 degrees.

Although not shown, in some embodiments, a block filter may be further included in the lens module body 760 in which the lens unit 750 is formed. To facilitate mounting of the block filter, a depression may be formed in the lens unit 750, and the lenses may be formed in the depression.

Referring to FIG. 7b, the alignment board 350 according to an embodiment of the present disclosure may include an alignment board body 810, and a guide column alignment hole 830 which is formed in the alignment board body 810. The alignment board body 810 may have a flat plate shape. The guide column alignment hole 830 is to be coupled with the guide column 710 of the lens module 320 for alignment of the lens module 320.

The number of guide column alignment holes 830 may correspond to the number of guide columns 710. For example, the number of guide column alignment holes 830 may be the same as the number of guide columns 710. Alternatively, in some embodiments, the number of guide column alignment holes 830 may be greater than the number of guide columns 710 so as to make various forms of coupling with the lens module 320 possible.

Furthermore, the guide column alignment hole 830 may be formed for alignment of the lens module 320 at a position corresponding to that of the guide column 710 of the lens module 320.

Although the case is illustrated in the drawing in which a portion of the guide column alignment hole 830 is open on an edge of the alignment board body 810, the present disclosure is not limited to this. That is, the guide column alignment hole 830 may be formed in a form in which it is not open on an edge of the alignment board body 810.

In some embodiments, the alignment board 350 may further include an alignment mark 820 which is used for alignment of the optical element 360. The alignment mark 820 is used to precisely mount the optical element 360. The alignment mark 820 may be formed at a position at which the optical element 360 is mounted.

Referring to FIG. 7c, the PCB 340 according to an embodiment of the present disclosure may include a PCB body 910, a package alignment hole 920 which is formed in the PCB body 910, and a filter module alignment hole 930. The PCB body 910 may have a flat plate shape. The filter module alignment hole 930 is formed to couple the filter module, including the lens module 320 and the alignment board 350, with the PCB 340. The package alignment hole 920 is used for coupling of the package 330 with the PCB 340.

The number of filter module alignment holes 930 may correspond to the number of guide columns 710. For example, the number of filter module alignment holes 930 may be the same as the number of guide columns 710. Alternatively, in some embodiments, the number of filter module alignment holes 930 may be greater than the number of guide columns 710 so as to make various forms of coupling with the lens module 320 possible. Of course, the number of filter module alignment holes 930 may be determined corresponding to the number of guide column alignment holes 830.

Furthermore, the filter module alignment hole 930 may be formed for alignment of the lens module 320 at a position corresponding both to that of the guide column 710 of the lens module 320 and to that of the guide column alignment hole 830 of the alignment board 350.

The package alignment hole 920 may be used to align and mount the PCB 340 in the package 330 and be formed such that a package guide column 1110 of the package 330 which will be described later with reference to FIG. 11 can be inserted into the package alignment hole 920.

The number of package alignment holes 920 may correspond to the number of package guide columns 1110. For example, the number of package alignment holes 920 may be the same as the number of package guide columns 1110. Alternatively, in some embodiments, the number of package alignment holes 920 may be greater than the number of package guide columns 1110 so as to make it possible to couple the PCB 340 to various types of packages 330.

Furthermore, the package alignment hole 920 may be formed at a position corresponding to the position of the package guide column 1110 of the package 330 so as to align the PCB 340 in the package 330.

In some embodiments, the PCB body 910 may have a two-stepped structure in order to minimize a wire bonding length. For example, as shown in FIG. 7c, the PCB body 910 may have a two-stepped structure having a stepped part 915 which is disposed behind a position at which the filter module 320 and 350 is aligned.

In some embodiments, the PCB body 910 may be made of a hard FP4 board or a flexible PCB (FPCB).

FIGS. 7a to 8 illustrate an example of the coupling relationship among the lens module 320, the alignment board 350, the PCB 340, etc. according to an embodiment of the present disclosure. The drive IC unit 370 and the optical element 360 may be disposed on the alignment board 350.

In more detail, the filter module, including the lens module 320 and the alignment board 350 that are coupled with each other, may be mounted on the PCB body 910 of the PCB 340. The guide column 710 of the lens module 320 is inserted into the guide column alignment hole 830 of the alignment board 350. The guide column 710 passes through the guide column alignment hole 830 and is inserted into the filter module alignment hole 930 of the PCB 340. In this way, the lens module 320, the alignment board 350, and the PCB 340 are aligned and fixed in place.

The optical element 360 may be disposed on the alignment mark 820 of the alignment board 350. The lower lens unit 730 of the lens module 320 may be disposed on the optical element 360. In order to adjust the distance between the optical device 360 and the lower lens unit 730 of the lens module 320, the protrusion 720 having a predetermined height may be formed on the lens module 320.

The drive IC unit 370 may be disposed on the upper surface of the alignment board body 810 of the alignment board 350.

The lens module 320, the alignment board 350, and the PCB 340 can be manually aligned at one time using the guide column 710 of the lens module 320, the guide column alignment hole 830 of the alignment board 350, the filter module alignment hole 930 of the PCB 340, etc.

In some embodiments, in the case where the PCB body 910 has a two-stepped structure, the filter module, including the lens module 320 and the alignment board 350 that are coupled with each other, may be mounted on a lower floor of the two-stepped structure of the PCB body 910. In some embodiments, the height of the alignment board 350 and the drive IC unit 370 may be the same as a difference in height between an upper floor and the lower floor of the PCB body 910. That is, an upper surface of the drive IC unit 370 on the alignment board 350 may be level with the upper surface of the upper floor of the PCB body 910.

In some embodiments, the filter module (having the lens) including the lens module 320 and the alignment board 350 may be formed by plastic injection molding. Furthermore, in the case where the injection molding method is used, the lens unit 750 of the filer module 320 and 350 and/or the lens of the lower lens unit 730 may be manufactured not only in a spherical shape but also in an aspherical shape so that the optical coupling efficiency can be enhanced.

Figure 9A:
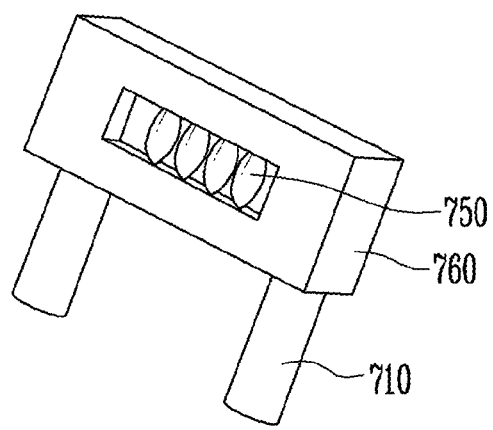
FIG. 9a is a view illustrating another example of the lens module according to the embodiment of the present disclosure.
Figure 9B:
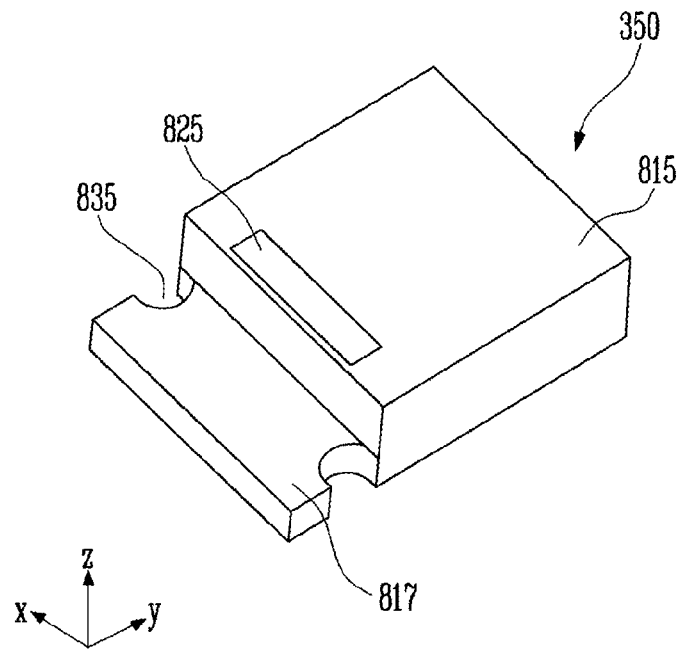
FIG. 9b is a view illustrating another example of the alignment board according to the embodiment of the present disclosure.
Figure 10:
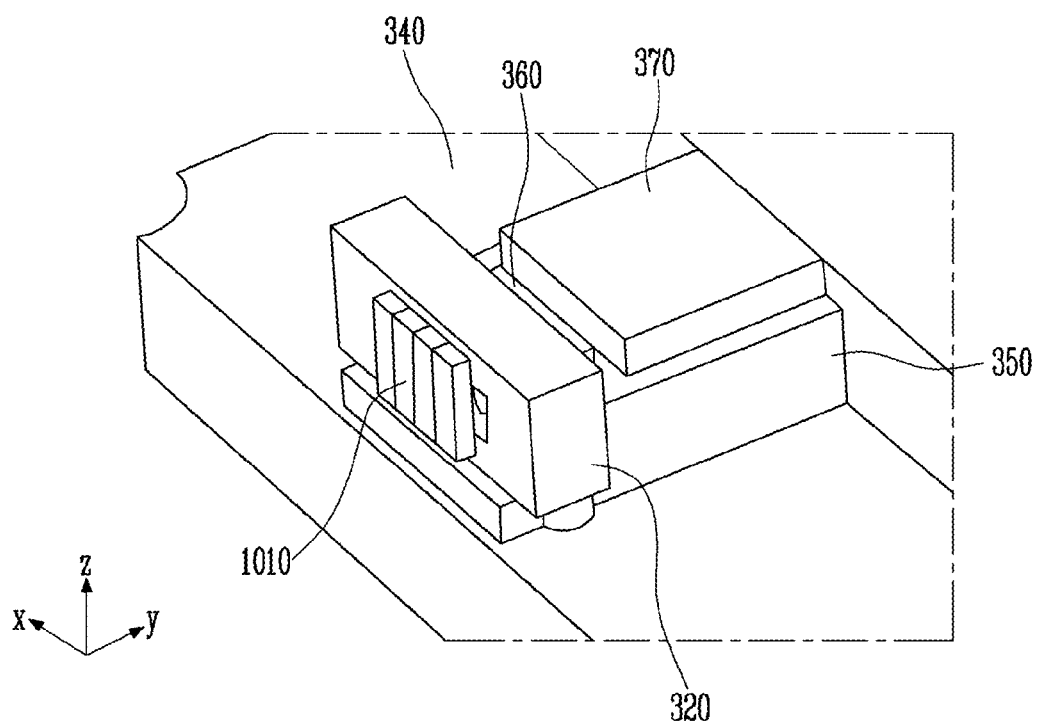
FIG. 10 is a view illustrating another example of the coupling relationship among the lens module, the alignment board, and the PCB according to the embodiment of the present disclosure.

FIG. 9a is a view illustrating another example of the lens module according to the embodiment of the present disclosure. FIG. 9b is a view illustrating another example of the alignment board according to the embodiment of the present disclosure. FIG. 10 is a view illustrating another example of the coupling relationship among the lens module, the alignment board, and the PCB according to the embodiment of the present disclosure.

Referring to FIG. 9a, the lens module 320 according to the embodiment of the present disclosure may include a lens module body 760, a guide column 710, and a lens unit 750.

Unlike the lens module 320 illustrated with reference to FIG. 7a, the lens module 320 according to the embodiment of FIG. 9a may be used when a light element 360 is an edge emitting light source such as a DFB LD (distributed feedback laser diode) or an FP LD (Fabry-Perot laser diode) and there is no need to change a beam path by 90 degrees.

In the lens module 320 according to this embodiment, the lower lens unit 730 and the reflective surface 470 included in the lens module 320 illustrated in FIG. 7a are not required.

In some embodiments, the lens module 320 may include a depression for reducing the distance between it and the optical element 360 and facilitating mounting of a block filter 1010 for a receiver. A plurality of lenses may be mounted in the depression.

The configurations of the guide column 710, the lens module body 760, and the lens unit 750 are similar to those of the guide column 710, the lens module body 760, and the lens unit 750 of the lens module 320 illustrated with reference to FIG. 7a; therefore, detailed description thereof will be omitted.

Although a protrusion 720 is not illustrated in FIG. 9a, the protrusion 720 may protrude downward from the lens module body 760, in some embodiments.

Referring to FIG. 9b, the alignment board 350 according to an embodiment of the present disclosure may include an alignment board body 815, and a guide column alignment hole 835 which is formed in the alignment board body 815 and 817. The alignment board body 815 and 817 may have a flat plate shape. The guide column alignment hole 835 is to be coupled with the guide column 710 of the lens module 320 for alignment of the lens module 320.

The alignment board body 815 of the alignment board 350 may have a stepped part 817. This is to make the optical element 360 mounted on an upper surface of the alignment board 815 be level with the lens unit 750 of the lens module 320 illustrated in FIG. 9a. In other words, for manual alignment of the lens module 320 and the optical element 360, the alignment board body 85 may have a two-stepped structure having the stepped part 817.

In some embodiments, the alignment board 350 may further include an alignment mark 825 which is used for alignment of the optical element 360.

The other configuration of the alignment board 350 is similar to that of the alignment board 350 that has been illustrated with reference to FIG. 7b; therefore, further explanation thereof will be omitted.

FIGS. 9a to 10 illustrate an example of the coupling relationship among the lens module 320, the alignment board 350, the PCB 340, etc. according to an embodiment of the present disclosure. A drive IC unit 370 and the optical element 360 may be disposed on the alignment board 350.

In more detail, the filter module, including the lens module 320 and the alignment board 350 that are coupled with each other, may be mounted on the PCB body 910 of the PCB 340. The guide column 710 of the lens module 320 is inserted into the guide column alignment hole 835 of the alignment board 350. The guide column 710 passes through the guide column alignment hole 835 and is inserted into a filter module alignment hole 930 of the PCB 340. In this way, the lens module 320, the alignment board 350, and the PCB 340 can be aligned and fixed in place.

The optical element 360 may be disposed on the alignment mark 825 of the alignment board 350. The lens module 320 may be disposed adjacent to an edge of the optical element 360. The lens unit 750 may be formed at a height corresponding to the alignment board 815, on which the optical element 360 is mounted, such that a beam emitted from the optical element 360 can be inputted to the lens unit 750 of the lens module 320.

The block filter 1010 may be mounted to the lens unit 750. For this, a depression may be formed in the lens unit 750, and a plurality of lens may be mounted in the depression. The block filter 1010 may be mounted outside the depression.

The drive IC unit 370 may be disposed on the upper surface of the alignment board body 815 of the alignment board 350.

As such, the lens module 320, the alignment board 350, and the PCB 340 can be manually aligned at one time using the guide column 710 of the lens module 320, the guide column alignment hole 835 of the alignment board 350, the filter module alignment hole 930 of the PCB 340, etc.

Figure 11:
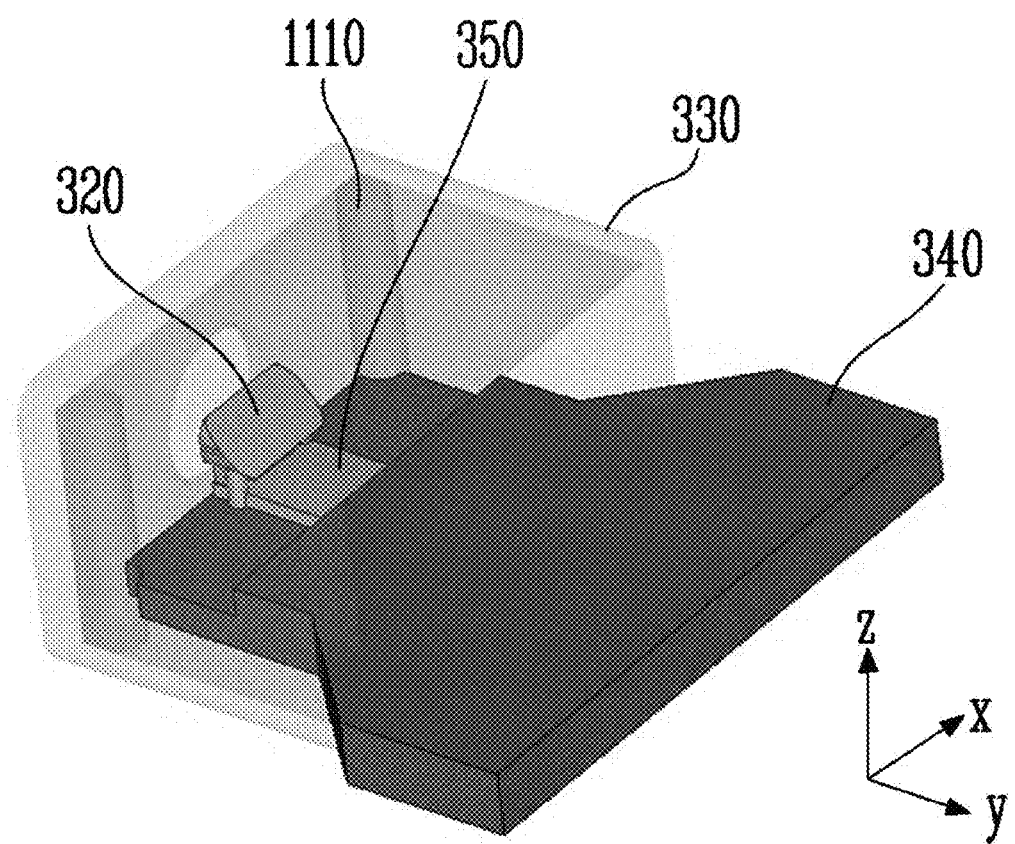
FIG. 11 is a view illustrating an example of the coupling between a package and the PCB according to an embodiment of the present disclosure.

FIG. 11 is a view illustrating an example of the coupling between the package and the PCB according to an embodiment of the present disclosure.

Referring to FIG. 11, the filter module including the lens module 320 and the alignment board 350 that are coupled with each other may be mounted on the PCB 340. The PCB 340 on which the filter module 320 and 350 are mounted may be aligned in the package 330.

The package 330 may include a package guide column 1110 for alignment of the PCB 340. The package guide column 1110 is inserted into the package alignment hole 920 formed in the PCB body 910 of the PCB 340, thus aligning and fixing the PCB 340 in the package 330.

In the drawing, expression of the drive IC unit 370 mounted to the alignment board 350 is omitted for the sake of explanation of the coupling relationship among the lens module 320, the alignment board 350, the PCB 340, and the package 330.

In this way, all of the lens module 320, the optical device 360, the alignment board 350, the PCB 340, and the package 330 can be manually aligned with each other.

Figure 12:
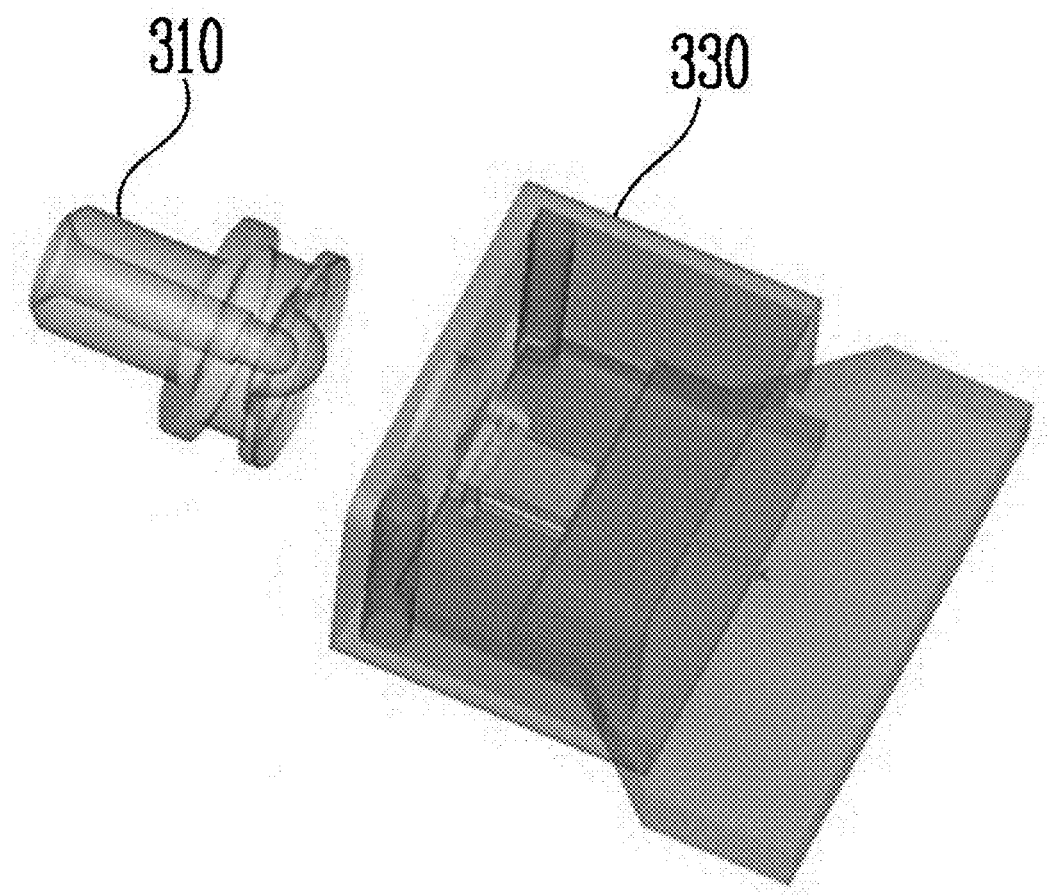
FIG. 12 is a view illustrating an example of the coupling relationship between the package and the optical receptacle according to an embodiment of the present disclosure.

FIG. 12 is a view illustrating an example of the coupling relationship between the package and the optical receptacle according to an embodiment of the present disclosure. FIG.

13 is a sectional view taken along the y-z direction, showing the optical module according to the embodiment of the present disclosure.

Figure 13:
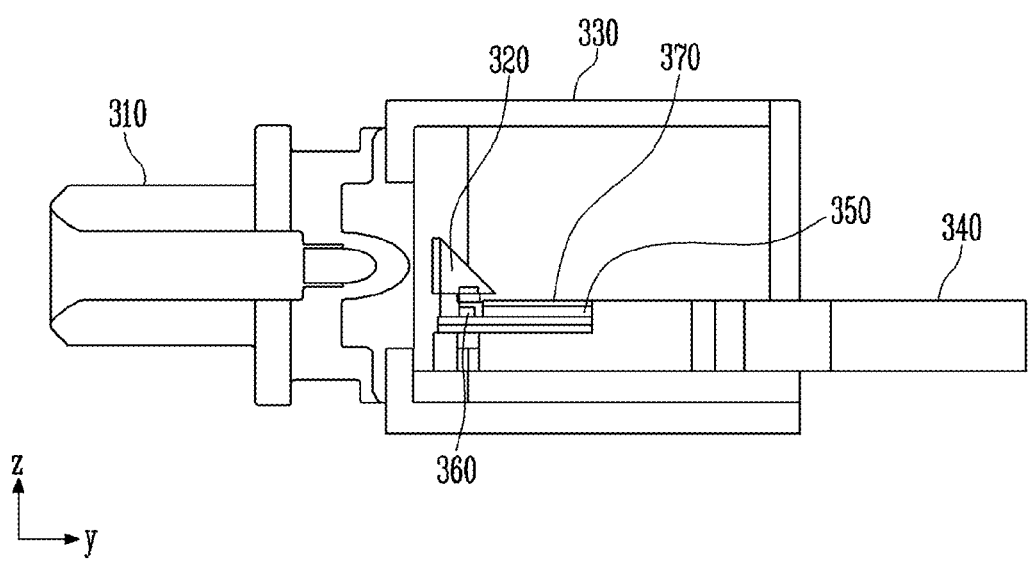
FIG. 13 is a sectional view taken along the y-z direction, showing the optical module according to the embodiment of the present disclosure.

Referring to FIGS. 12 and 13, the optical receptacle 310 may be aligned with and coupled to the package 330 in which the lens module 320, the optical element 360, the alignment board 350, and the PCB 340 are mounted.

The optical receptacle 310 may be coupled to the package 330 such that the surface of the optical receptacle 310 on which the second lens 440 is formed faces the lens unit 750 of the lens module 320.

The optical element 350 and the drive IC unit 370 may be formed on the upper surface of the alignment board 350. The lens module 320 may be coupled to the alignment board 350 such that the lens module 320 is disposed over the optical element 350. The alignment module 320 to which the lens module 320 is coupled may be coupled on the PCB 340 and mounted in the package 330. The package 330 and the optical receptacle 310 may be coupled with each other.

In some embodiments, as optical modules according to the present disclosure may be horizontally arranged in a row, the optical element 360 may be an array-type optical element. Thereby, light loss which may be caused on a central portion of a light source in the case of a two-dimensional structure can be minimized. In addition, reduction in size is possible.

Figure 14:
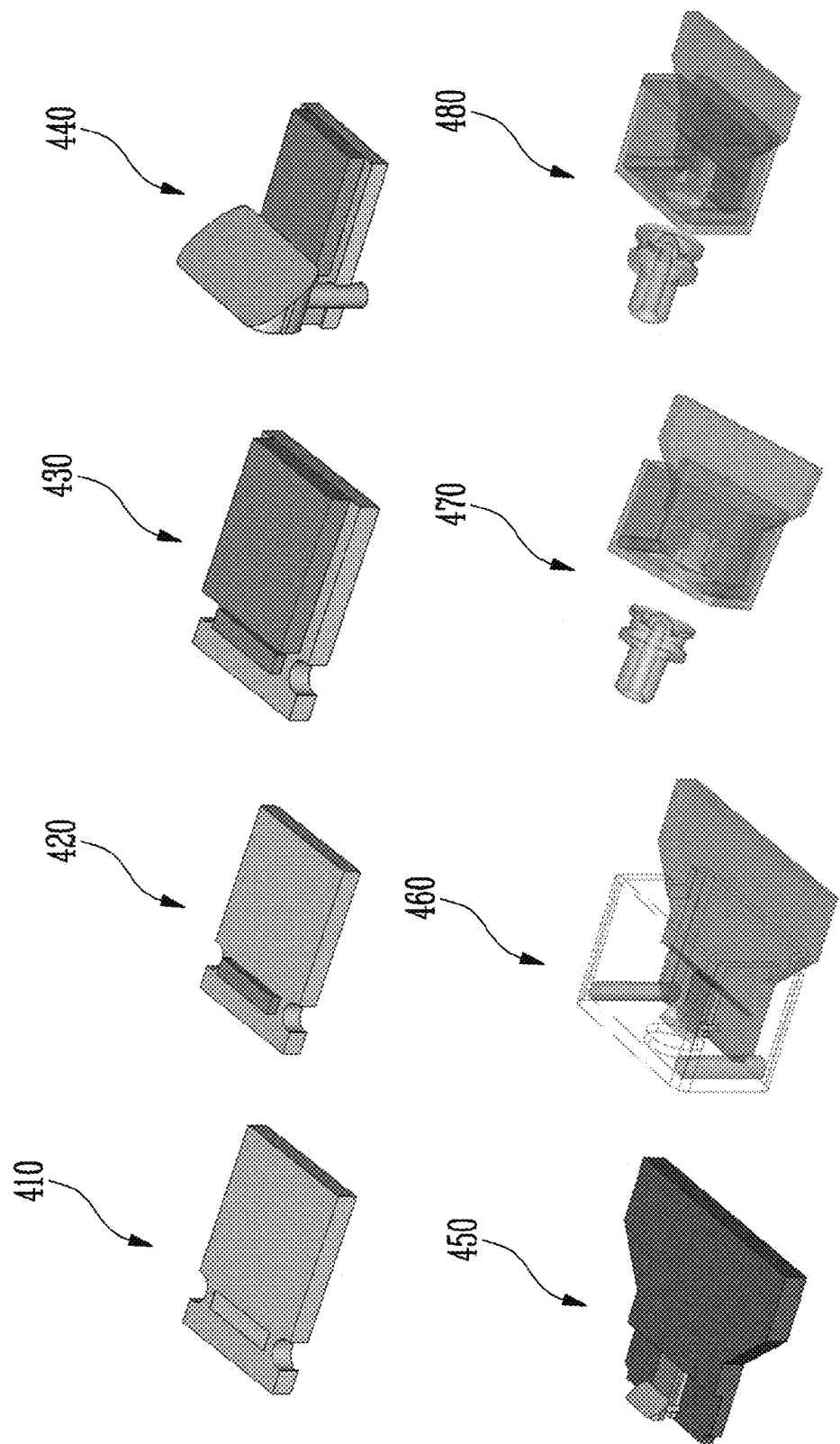
FIG. 14 is a view illustrating an example of a method of manufacturing the optical module according to an embodiment of the present disclosure.

FIG. 14 is a view illustrating an example of a method of manufacturing the optical module according to an embodiment of the present disclosure.

Referring to FIG. 14, at step 410, the alignment board 350 may be prepared. At step 420, the optical element 360 may be precisely mounted on the alignment mark 820 of the alignment board 350 in a manual surface-mounting manner. At step 430, the drive IC unit 370 may be mounted on the alignment board body 810 of the alignment board 350 in the same manner. Meanwhile, at step 410, as mentioned above, the alignment board 350 may be formed by plastic injection molding.

At step 440, the alignment board 350 and the lens module 320 may be coupled with each other. At step 450, the filter module including the lens module 320 and the alignment board 350 that are coupled with each other may be mounted on the PCB 340. Meanwhile, at step 440, the lens module 320 may be formed by plastic injection molding. A lens included in at least one of the lens unit 750 and the lower lens unit 730 may be formed in either a spherical shape or an aspherical shape.

At step 460, the PCB 340 may be mounted in the package 330. At step 470, the optical receptacle 30 and the package 330 may be aligned with each other. Meanwhile, at step 470, the optical receptacle 310 may be formed by plastic injection molding. At least one of the first lens 430 and the second lens 440 included in the optical receptacle 310 may be formed in either a spherical shape or an aspherical shape.

At step 480, the package 330 may have a hermetic seal, thus forming the optical module.

As described above, various embodiments of the present disclosure provide an optical module and a method of manufacturing the same, in which: optical components can be mounted using a manual surface mounting technique; a receptacle active-alignment technology can be used; and a circular beam can be transformed in a horizontally rectangular beam using an optical receptacle including a semilunar lens, or a rectangular beam can be divided and transformed into circular beams again using a vertically elongated elliptical lens, so that it is possible to arrange optical elements in a row. Furthermore, the optical module according to the present disclosure is provided with an alignment mark, thus making it possible to precisely mount an optical element. Since a guide column alignment hole and a filter module alignment hole are formed in the optical module, a filter module including a lens module and an alignment board can be precisely aligned with a PCB. In addition, the optical module includes a package guide column so that the PCB and the package can be aligned at one time. Moreover, the lens module includes a protrusion which maintains the distance between it and the optical element constant.

Furthermore, the embodiments disclosed in the present specification and the drawings just aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Meanwhile, exemplary embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims.

The invention claimed is:

1. An optical module comprising:
an optical receptacle including a first lens and a second lens, the second lens being disposed over an outer surface of the first lens, the optical receptacle emitting or receiving a rectangular beam;
a lens module including a lens unit facing the second lens of the optical receptacle; and
an optical element configured to receive a beam emitted from the lens module or emit a beam to the lens module,
wherein a horizontal length and a vertical length of a cross-section of the first lens differ from each other, and a horizontal length and a vertical length of a cross-section of the second lens differ from each other, the cross-section of the first lens and the cross-section of the second lens being perpendicular to a propagation direction of the rectangular beam.

2. The optical module according to claim 1, further comprising:
an alignment board provided to align the lens module.

3. The optical module of claim 2,
wherein the lens module further includes a guide column, and
wherein the alignment board includes a guide column alignment hole into which the guide column is inserted.

4. The optical module of claim 3, further comprising:
a printed circuit board on which the lens module and the alignment board are mounted,
wherein the printed circuit board includes a filter module alignment hole into which the guide column is inserted.

5. The optical module of claim 4, further comprising:
a package comprising a package guide column configured to mount the printed circuit board in the package,
wherein the printed circuit board further includes a package alignment hole into which the package guide column is inserted.

6. The optical module of claim 2,
wherein the alignment board includes an alignment mark, and wherein the optical element is mounted on the alignment mark.

7. The optical module of claim 2, further comprising:
a drive integrated circuit disposed on the alignment board.

8. The optical module of claim 1, wherein the lens module further comprises a lens module body and a guide column, the guide column protruding from the lens module body,
wherein the lens unit is disposed on a surface of the lens module body that faces the second lens, and
wherein the lens module body includes an inclined reflective surface.

9. The optical module of claim 8,
wherein the lens module further comprise a lower lens unit disposed on a lower surface of the lens module body,
wherein the optical element is disposed below the lower lens unit, and
wherein the lens module further comprises a protrusion provided on the lower surface of the lens module body and configured to maintain a distance between the optical element and the lower lens unit.

10. The optical module according to claim 1, wherein the lens module further comprises a block filter provided in the lens unit.

11. The optical module according to claim 1, wherein at least one of the first lens, the second lens, and the lens unit comprises a spherical lens or an aspherical lens.

12. The optical module according to claim 1, wherein the optical element comprises an array-type optical element.

13. The optical module according to claim 1, wherein the lens module further comprises a lens module body and a pair of guide columns, the pair of guide columns protruding from a bottom surface of the lens module body, the optical module further comprising:
a printed circuit board (PCB) including a pair of filter module alignment holes into which the pair of guide columns are inserted; and
an alignment board disposed between the lens module body and the printed circuit board and including a pair of guide column alignment holes through which the pair of guide columns penetrate.

14. A method of manufacturing an optical module, comprising:
forming an optical receptacle including a first lens formed such that a horizontal length and a vertical length of a cross-section of the first lens differ from each other, and a second lens formed such that a horizontal length and a vertical length of a cross-section of the second lens differ from each other, the second lens being disposed over an outer surface of the first lens, the cross-section of the first lens and the cross-section of the second lens being perpendicular to a propagation direction of a rectangular beam emitted from or received by the optical receptacle;
forming a lens module including a lens unit and a guide column;
aligning the lens module by inserting the guide column of the lens module into a guide column alignment hole of an alignment board; and
aligning the optical receptacle such that the lens unit faces the second lens of the optical receptacle.

15. The method of claim 14, further comprising:
aligning the lens module and the alignment board on a printed circuit board by inserting the guide column into a filter module alignment hole of the printed circuit board,
wherein the lens module further includes a lens module body, and the guide column protrudes from the lens module body.

16. The method of claim 15, further comprising:
aligning the printed circuit board in a package by inserting a package guide column of the package into a package alignment hole of the printed circuit board.

17. The method according to claim 16, wherein the aligning of the optical receptacle comprises:
sealing the optical receptacle with the package.

18. The method according to claim 14, wherein the aligning of the lens module comprises:
mounting an optical element on an alignment mark of the alignment board.

19. The method according to claim 14, wherein the forming of the optical receptacle comprises:
forming the optical receptacle using a plastic injection molding method, and
wherein the forming of the lens module comprises:
forming the lens module using a plastic injection molding method.

20. An optical module comprising:
an optical receptacle including a first lens and a second lens, the second lens being disposed over an outer surface of the first lens, the optical receptacle emitting or receiving a rectangular beam;
a lens module including a lens unit facing the second lens of the optical receptacle; and
an optical element configured to receive a beam emitted from the lens module or emit a beam to the lens module,
wherein each of the first lens and the second lens has an oblong cross-section that is perpendicular to a propagation direction of the rectangular beam.

* * * * *